United States Patent [19]

Davis

[11] 4,386,783

[45] Jun. 7, 1983

[54] PACKING NUT AND STUFFING BOX FOR HYDRAULIC OR MANUAL ACTUATION

[75] Inventor: Glenn R. Davis, Irving, Tex.

[73] Assignee: Otis Engineering Corporation, Dallas, Tex.

[21] Appl. No.: 296,459

[22] Filed: Aug. 26, 1981

[51] Int. Cl.³ ............................................. F16J 15/46
[52] U.S. Cl. .................................... 277/73; 277/103; 277/108; 277/111; 277/126
[58] Field of Search .......................... 277/73, 102–104, 277/108, 110, 111, 116.2, 116.4, 126, 127

[56] References Cited

U.S. PATENT DOCUMENTS

| | | | |
|---|---|---|---|
| 1,719,223 | 7/1929 | Grohek | 277/103 |
| 2,188,425 | 1/1940 | Black | 277/126 X |
| 3,013,825 | 12/1961 | Wilson | 277/73 |
| 3,228,703 | 1/1966 | Wilson | 277/73 |
| 3,468,549 | 9/1969 | Wilson | 277/73 X |
| 3,762,725 | 10/1973 | Taylor | 277/73 X |

Primary Examiner—Robert S. Ward, Jr.
Attorney, Agent, or Firm—Roland O. Cox

[57] ABSTRACT

A packing nut which when retrofitted to or assembled into a stuffing box and hydraulically or manually actuated applies force to packing in the stuffing box, compressing the packing to seal on stationary wireline or pump rods or to wipe or seal on moving wireline or rods passing through a hole in a piston rod on which there is an operating piston in the packing nut body. The piston rod may be rotated to adjust its length for packing contact, and desired packing compression may be maintained by further rod rotation if pressured fluid is not available for hydraulic actuation. A connection for a remotely pressured fluid conduit is provided on the packing nut housing to deliver actuating fluid to the operating piston.

21 Claims, 3 Drawing Figures

PACKING NUT AND STUFFING BOX FOR HYDRAULIC OR MANUAL ACTUATION

This invention pertains to a device for compressing packing which may be hydraulically or manually actuated and more particularly a device within a stuffing box which, when actuated, will compress packing to wipe or seal on wireline or rods extending through the stuffing box.

Stuffing boxes, sometimes called line wipers or line strippers, have been used for many years in the petroleum industry to provide wiping action and/or as a sealing device between surface extensions of well production piping and stationary or reciprocating wireline, cable, or rods which extend into the production piping to maintain pressure control of a well. Working on or in close proximity to a wellhead was early found to be very hazardous, and packing nuts which could be actuated remotely to compress stuffing box packing were soon developed.

Prior art in this technical field includes: U.S. Pat. No. 2,295,683 to Osmun, showing a mechanical packing adjuster manually operated by cranking a rod extension; U.S. Pat. No. 3,013,825 to Wilson, showing a wireline stripper hydraulically actuated to compress packing; U.S. Pat. No. 3,228,703 also to Wilson, disclosing a line stripper and packing element therefor, also hydraulically operated to compress the packing; and another U.S. Pat. No. 3,468,549 to Wilson, disclosing a line wiper with dual resilient elements which may be compressed hydraulically. Another U.S. Pat. No. 3,762,725 to Taylor, incorporated herein by reference, discloses a wireline stuffing box and sheave with a hydraulically actuated packing compressor with fluid pressure applied to both sides of an operating piston for closely adjusting packing compression and frictional engagement of packing with wireline. A similar device is currently offered by Texas Oil Tools, Inc., Houston, Tex., as Wireline Stuffing Box Unit 1013. The packing compressor in the Wireline Stuffing Box Unit 1013, which is similar to the device of this invention in that apparently it may be hydraulically actuated and manually positioned and actuated, but, unlike the present invention, it cannot be readily rotated to manually position and actuate without disconnecting piping or hoses supplying pressured fluid for hydraulic actuation to the operating piston. Two other similar devices, offered by Otis Engineering Corporation, are disclosed on pages 88 and 89 of their catalog OEC 5121C entitled "Wireline Subsurface Flow Controls and Related Service Equipment". Neither of the Otis hydraulic packing nuts shown may be manually positioned or actuated. Attachment of the Otis hydraulic packing nut on page 89 to a wireline stuffing box was found to require extensive disassembly and removal of a number of parts in addition to the manual packing nut from a stuffing box assembly.

The packing nut of the present invention may be assembled into a stuffing box on initial assembly or may be used as a kit and retrofitted to readily convert an existing stuffing box assembly with or without a sheave, which is equipped with a threaded packing nut, into a stuffing box assembly with a hydraulically operated packing nut which may be actuated and controlled remotely to maintain wiping action or sealing engagement of resilient packing with wireline running through the stuffing box. Means are provided on the packing nut body for connection of pressure fluid conduits for delivering pressured fluid from remote pressure sources to the packing nut operating piston for hydraulic actuation. The rod in the packing nut of the present invention may be positioned manually for initial packing contact and also actuated manually in case of failure of or no available pressure source. The packing nut lower housing has means for connection to a stuffing box and may be attached to a stuffing box with minor disassembly and removal of very few parts from the stuffing box. This packing nut may be attached to or assembled into the limited space between a sheave and the upper end of the stuffing box body in a stuffing box with a sheave.

An object of this invention is to provide an improved hydraulically actuated packing nut with a rod which may be manually positioned for initial packing contact.

Another object is to provide an improved hydraulically actuated packing nut which may be conveniently actuated manually to maintain desired compression on stuffing box packing when hydraulic pressure is not available.

Another object is to provide an improved hydraulic/manual packing nut which may be attached to a stuffing box assembly with less effort.

Also, an object of this invention is to provide an improved hydraulic manual packing nut which is compact enough to be attached to a stuffing box with limited space therefor.

Figure 1:
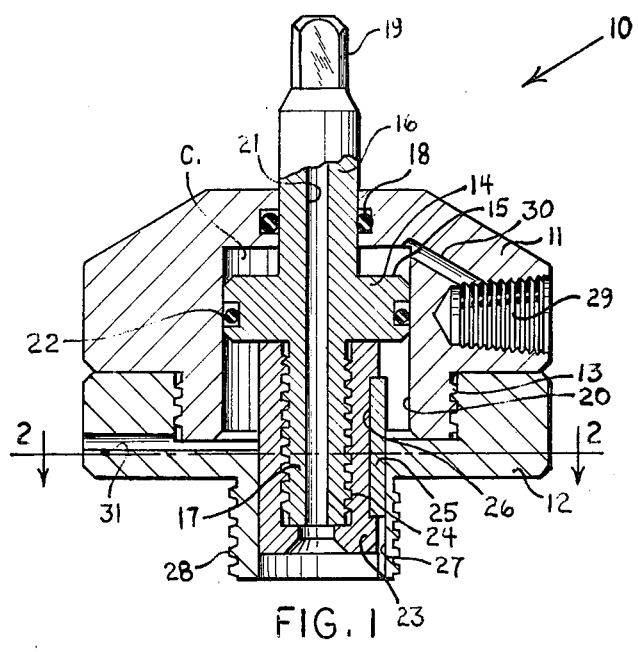
FIG. 1 is a mostly sectioned elevation drawing of the invention packing nut.
Figure 2:
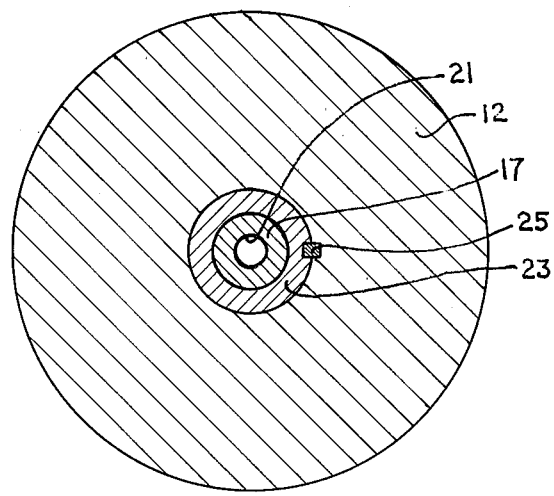
FIG. 2 is a section drawing viewed in the direction of arrows on cutting plane line 2—2 in FIG. 1.

A preferred embodiment is depicted by FIG. 1 showing the invention packing nut 10 wherein there is an upper housing 11 connected to a lower housing 12 with threads 13 in which is housed an operating piston 14. The operating piston 14 has a pressure responsive surface 15 and a rod 16 extending from its upper end and a threaded rod 17 extending from its lower end. The rod 16 is slidably and rotatably sealed to the upper body by resilient seal 18. On the upper end of rod 16 there are wrench flats 19. The operating piston 14 is slidably and rotatably sealed to seal bore 20 in upper housing 11 by resilient seal 22 forming a variable volume chamber C. An axial hole 21 has been drilled concentrically through rod 16, piston 14, and threaded rod 17. Male threads on threaded rod 17 are threadedly engaged in female threads in sleeve 23 at 24. A key 25 is positioned in key slot 26 cut into the outside surface of sleeve 23 and retained therein as key 25 is aligned with and moved longitudinally, by threads at 24, into cooperating keyway 27 in lower housing 12, as rod 16 is rotated. Key 25 is trapped in slot 26 by keyway 27, and sleeve 23 is thereby keyed to lower housing 12, but may be moved longitudinally. Threads 28 are provided on lower housing 12 to connect the packing nut 10 to a stuffing box. Threads 29 for connection of piping or hoses are provided in upper housing 11. A flow passage 30 is provided in the upper housing to deliver pressured fluid in hoses connected at 29 to the pressure responsive surface 15 on operating piston 14. A relief hole 31 is provided in lower housing 12 to assure free axial movement of operating piston 14.

The packing nut may be assembled into a stuffing box with or without a sheave during initial assembly or attached to an existing stuffing box with or without a sheave.

Figure 3:
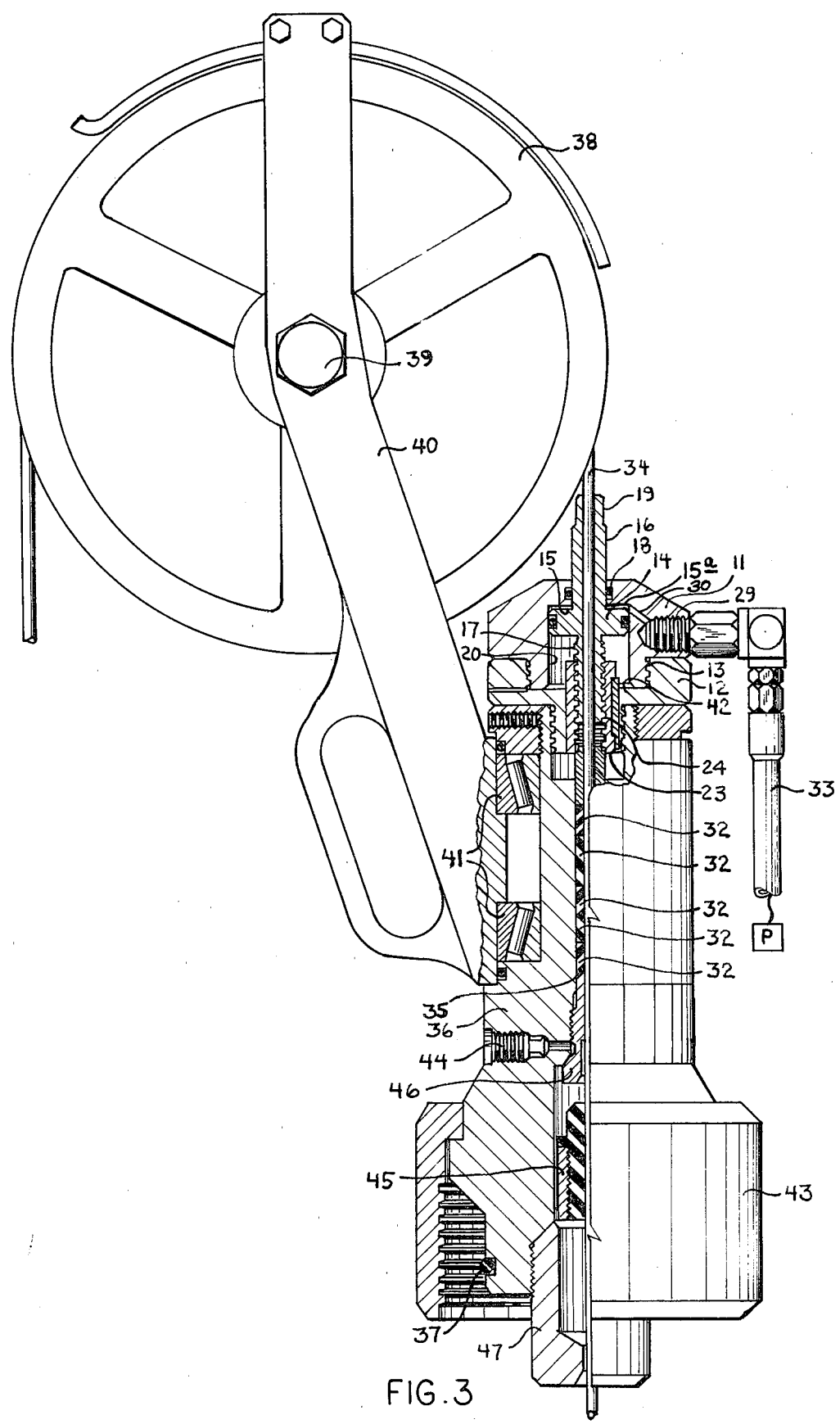
FIG. 3 is a partly sectioned elevational view drawing of a stuffing box including the packing nut of the present invention shown with a portion of a pressure fluid conduit connected to the upper housing and a schematically represented remote pressure source P.

FIG. 3 shows a stuffing box with sheave with an invention packing nut therein. In application, rod 16 would be turned to screw threads 24 moving sleeve 23 up to remove any compressing load on the packing rings 32 to allow free passage of wireline 34 or the like, which is to be extended through the stuffing box and into the well through axial hole 21 in rod 16, operating piston 14, and rod 17. As sleeve 23 is keyed to lower housing 12, turning rod 16 turns operating piston 14 and threaded rod 17, screwing or unscrewing threads 24 and repositioning sleeve 23 close or away from operating piston 14. Rod 16 is turned to unscrew threads 24 and move sleeve 23 down to contact the top of stacked resilient packing rings 32 and then move operating piston 14 up until pressure responsive surface 15 contacts shoulder 15a in upper housing seal bore 20. Further unscrewing of threads 24 applies compression distorting packing rings 32 to wipe or to seal around wireline 34 and between seal bore 35 in stuffing box body 36.

Pressure conduit piping or hoses 33 required to deliver pressured fluid from remote pressure source P, such as a hand pump, to pressure responsive surface 15 are connected to the packing nut upper housing 11 at threads 29.

The stuffing box of FIG. 3 is then attached to a lubricator or production pipe extending from the well with collar 43 sealing thereto at resilient seal 37 and preventing any pressure in the lubricator or well pipe extension from leaking by the wireline to the surrounding atmosphere, thereby maintaining pressure control of the well.

Grooved sheave 38 guides and positions wireline 34 to pass concentrically through the stuffing box and packing as it is run in or pulled out of the well. Sheave 38 is free to rotate about shaft 39 secured in a slot in bracket 40 which is swivelably mounted to stuffing box body 36 with roller bearings 41. Bleed valve 44 is provided in stuffing box body 36 to allow exhausting of well pressure from inside the stuffing box body if need arises. Plug seal 45 is provided to be lifted by outflow into and sealed in line guide 46 to retain pressure control of the well in the event of any sealing failure of packing rings 32. Retainer 47 holds plug seal 45 in position to be easily lifted by any outflow.

Those skilled in this art will understand that the invention packing nut may be utilized for many applications, and its uses are not limited to only those described herein.

When rigid rods extend through the stuffing box, a sheave is not required, and other means such as a pumping jack are used to position the rods properly to run concentrically through the stuffing box and packing rings.

As flexible wireline or rigid rods are run in, pulled out, or reciprocated through stuffing box packing rings 32, the inside surfaces in compressed contact with the outside surfaces of rods or line running therethrough are abraded and worn away by rubbing friction therebetween. As surface roughness of wireline and rods vary greatly, time to wear away packing rings 32 will vary accordingly, but eventually as leakage around wireline or rods or incomplete wiping of liquids from the wireline or rods is evident, the packing rings 32 must be further compressed and distorted again to seal and/or wipe as required.

Additional compression may be applied to the packing rings 32 by increasing the pressure from pressure source P on liquids in hose 33 which act through flow passage 30 on piston pressure responsive surface 15 to move operating piston 14 and sleeve 23 down. Downward movement of operating piston 14 is stopped by shoulder 42 in lower housing 12. If sleeve 23 has not contacted the top of packing rings 32 when operating piston 14 is down against shoulder 42, then rod 16 should be turned to move sleeve 23 and reposition it away from operating piston 14.

What is claimed is:

1. A device for compressing packing in a stuffing box which may be hydraulically or manually actuated comprising:
   a. housing means including:
      (1) an upper housing with a bore therethrough; and
      (2) a lower housing with a bore therethrough and means on its lower end for attachment to a stuffing box;
   b. means on said upper and lower housings for connecting them together; and
   c. rod means in said housing means for engaging said packing, including:
      (1) a rod with a passage therethrough;
      (2) length adjusting means on said rod for applying more or less compression to said packing; and
      (3) pressure responsive means on said rod for moving said rod means to compress said packing.

2. The device of claim 1 including means limiting longitudinal movement of said pressure responsive means relative to said housing means.

3. The device of claim 2 further including a pressure source in pressure communication with said pressure responsive means.

4. The device of claim 3 wherein said rod includes a portion external of said housing means and an internal portion engaging said length adjusting means.

5. The device of claim 4 wherein said length adjusting means includes:
   a. a sleeve movably positioned on said internal rod portion; and
   b. means preventing rotation of said sleeve relative to said lower housing.

6. A device according to claim 5 wherein said means preventing rotation of said sleeve is a key housed in a slot on said sleeve and in a keyway in said lower housing.

7. The device of claim 6 wherein means responsive to pressure includes:
   a. a piston on said rod sealingly engaging said upper housing and forming a variable capacity chamber therewith; and
   b. means for conducting actuating fluid into said chamber.

8. The device of claim 7 wherein means for conducting actuating fluid to said chamber is a flow passage in said upper housing having one end thereof in pressure communication with a pressure source.

9. The device of claim 8 wherein means limiting longitudinal movement of said pressure responsive means is a shoulder in said upper housing and a surface in said lower housing.

10. The device of claim 9 wherein means on said upper and lower housing for connecting them together are threads.

11. The device of claim 10 further including wrench flats formed on said external rod portion.

12. A stuffing box for attachment to a pressure vessel which may be hydraulically or manually actuated to compress packing therein to wipe or seal on wireline or rods passing therethrough comprising:
 a. a body with a bore therethrough and a shoulder in said bore;
 b. means on the lower end of said body for sealing attachment to a pressure vessel;
 c. resilient packing disposed in said body bore on said internal shoulder about said wireline or rods extending therethrough;
 d. resilient plug seal means disposed about said wireline or rods below said shoulder;
 e. valve means in said body for exhausting pressure from below said packing;
 f. housing means attached to the upper end of said body for housing rod means;
 g. rod means in said housing means engageable with said package including:
  (1) a rod with a passage therethrough;
  (2) length adjusting means on said rod for applying more or less compression to said packing; and
  (3) pressure responsive means on said rod for moving said rod means to compress said packing.

13. The apparatus of claim 12 including means limiting longitudinal movement of said pressure responsive means relative to said housing means.

14. The apparatus of claim 13 further including a pressure source in pressure communication with said pressure responsive means.

15. The apparatus of claim 14 wherein said sealing attachment means are a threaded collar with a shoulder therein, said shoulder engageable with an external shoulder on said body and a resilient seal on said body below said shoulders.

16. The apparatus of claim 15 wherein said resilient plug seal means comprise resilient material molded in and bonded to a supporting metal sleeve with a passage therethrough.

17. The apparatus of claim 16 wherein said valve means comprise a valve threadedly received in said body, an annular seat for said valve and a flow passage communicating said body bore with said annular seat.

18. A stuffing box for attachment to a pressure vessel which may be hydraulically or manually actuated to compress packing therein to wipe or seal on wireline passing therethrough comprising:
 a. a body with a bore therethrough and a shoulder in said bore;
 b. means on the lower end of said body for attachment to a pressure vessel;
 c. resilient packing disposed in said body bore on said internal shoulder about said wireline extending therethrough;
 d. resilient plug seal means disposed about said wireline below said shoulder;
 e. valve means in said body for exhausting pressure from below said packing;
 f. sheave bracket means swivably mounted to said body for supporting and positioning a sheave for guiding said wireline concentrically through said packing;
 g. housing means attached to the upper end of said body for housing rod means;
 h. rod means in said housing means engageable with said packing including:
  (1) a rod with a passage therethrough;
  (2) length adjusting means on said rod for applying more or less compression to said packing; and
  (3) pressure responsive means on said rod for moving said rod means to compress said packing.

19. The apparatus of claim 18 including means limiting longitudinal movement of said pressure responsive means relative to said housing means.

20. The apparatus of claim 19 further including a pressure source in pressure communication with said pressure responsive means.

21. The apparatus of claim 20 wherein said sheave bracket means comprise:
 a. a sheave; and
 b. a sheave support bracket slotted to receive said sheave, said sheave being rotatably secured therein by a shaft connected to said bracket.

* * * * *